UNITED STATES PATENT OFFICE.

JOHN L. MALM, OF DENVER, COLORADO.

PROCESS OF TREATING METAL AND MINERAL BEARING MATERIALS.

1,185,817. Specification of Letters Patent. Patented June 6, 1916.

No Drawing. Application filed February 21, 1911. Serial No. 609,931.

*To all whom it may concern:*

Be it known that I, JOHN L. MALM, a citizen of the United States, residing at Denver, in the county of Denver and State of Colorado, have invented certain new and useful Improvements in Processes of Treating Metal and Mineral Bearing Materials, of which the following is a specification.

This invention relates to a method of treating metal and mineral bearing substances, and is particularly adapted for the treatment of sulfid ores containing iron and other metals such as copper, gold, zinc and silver.

In carrying out the invention any preferred form and construction of apparatus may be employed so long as it is in accordance with the necessary requirements, but it must consist of a tube mill of any preferred construction, a roasting furnace in which the dry ore may be roasted, and an agitator for agitating the roasted ore in a solution.

The process primarily is designed to eliminate the iron from the ore and to render the other metals in solution from which they may be obtained by any of the well known processes.

In carrying out the invention, the dry ore is fed into a tube or other mill where it is subjected to the action of a halogen gas, preferably chlorin, and a cooling agent in the form of air, whereby gas may act upon the metal contents to such an extent that the chlorin gas is combined with the iron sufficiently to form either the ferrous or ferric chlorid dependent upon the metal contents of the ore, this condition, namely the "ous" or the "ic" condition of the iron, being determined by supplying the proper quantity of chlorin to the iron so that sufficient chlorin for recovering the other metals in the ore may be obtained from the iron chlorid when it is broken up. The first step of the process, therefore, is the partial chloridization of the metal contents and formation of ferric or ferrous chlorid.

*Treatment in the roasting furnace.*—The substantially dry ore passing from the tube is then charged into a suitable roasting furnace and sufficient heat is applied in the first instance to cause the sulfur in the ore to produce sufficient heat to ignite the ore. The external heat or the supplied heat may then be eliminated or shut off, if there is sufficient sulfid contents in the ore to furnish the necessary heat. If there should not be a sufficient quantity of sulfid contents, additional heat must be provided.

The operation in the furnace and presence of heat breaks up the ferric or ferrous chlorid and liberates chlorin as such or as hydrochloric acid which units with the sulfids which were undecomposed or only partly decomposed in the tube mill, and if the chloridization were sufficient in the tube, by way of there being furnished sufficient chlorin to the iron for chloridizing the balance of the metal contents of the ore, complete chloridization of the lead, copper and zinc will take place in the furnace, leaving the iron and manganese in an inert oxid condition. By this step in the process the iron and the manganese are reduced to an inert state in the mass at this stage, and the solution may be handled for the recovery of lead, copper and zinc by any well known process. Any gold and silver which may be present in the ore will not be delivered in solution but remain in the gangue in the filter press and may be recovered by cyaniding and amalgamation. The great advantage in the treatment of the ore in this manner and the elimination of the iron from it obviates the use of a large quantity of zinc oxid which would otherwise be necessary in refining the solutions. The above refers to a saving which occurs in the treatment for reclaiming the metals and refining the solution, these steps or treatments occurring after the treatment in the agitator and thus forming no part of the present invention, it only being important to note that when zinc oxid is used in the refining treatment a saving is brought about by reducing the iron to an inert state in an earlier stage of the process.

Should the chlorin of the iron contents of the ore be more than sufficient to chloridize the lead, copper and zinc it will pass off in the form of free chlorin out through the stack and there would be a waste, but this is prevented by feeding into the furnace, during the roasting process, a small quantity of fresh or untreated ore which forms a filter and takes up the excess chlorin and prevents the waste above noted.

By the partial chloridization in the tube an excess amount of heat is prevented, thereby preventing balling and lumping of the ore, and by the treatment in the furnace the iron and manganese as well as the gold and silver are eliminated from the solution, so that lead, copper and zinc may be obtained directly from the solution with a comparatively small quantity of zinc.

*Treatment in the agitator.*—The roasted ore, while it is still warm, is charged into any suitable agitator with hot water, where the salts of the metals, lead, copper and zinc, will immediately pass into solution, the iron oxid remaining inert and the gold and silver remaining unaffected in the gangue. If the complete chloridization is not effected and a portion of the metal contents does not pass into solution in the agitator, a small quantity of chlorin may be added to bring about the chloridization of such unaffected particles of the metal contents. The chloridization in the tube, however, should at all times be sufficient to chloridize all the iron in the ore.

Having described my invention, I claim:—

1. The herein described process of treating ores containing sulfids of metals, the chlorids of some of which metals are decomposable by heat at a relatively low temperature, such decomposition liberating chlorin and rendering the metal in an inert state, which consists in partially chloridizing the ore to the extent of forming sufficient low temperature decomposable metallic chlorids to provide, when decomposed, chlorin for the complete chloridization of substantially the entire remaining metallic contents of the ore, thereafter subjecting the partially chloridized mass to the action of heat at the proper temperature to decompose the low temperature decomposable metallic chlorid whereby its chlorin may act on the unchloridized metallic contents and completely chloridize the same, and finally treating the mass for the recovery of the values.

2. The herein described process of treating ores containing sulfids of metals including iron, which consists in partially chloridizing the ore to the extent of forming sufficient iron chlorids to provide, when decomposed, chlorin for the complete chloridization of substantially the entire remaining metallic contents of the ore, whereby its chlorin is liberated for action on the unchloridized metallic contents, and decomposing the iron chlorids to liberate the chlorin therefrom for action upon the unchloridized metallic contents.

In testimony whereof I affix my signature in presence of two witnesses as follows:

JOHN L. MALM.

Witnesses:
  CHRISTINE H. TRESCH,
  B. W. BROCKETT.